Figure 7:
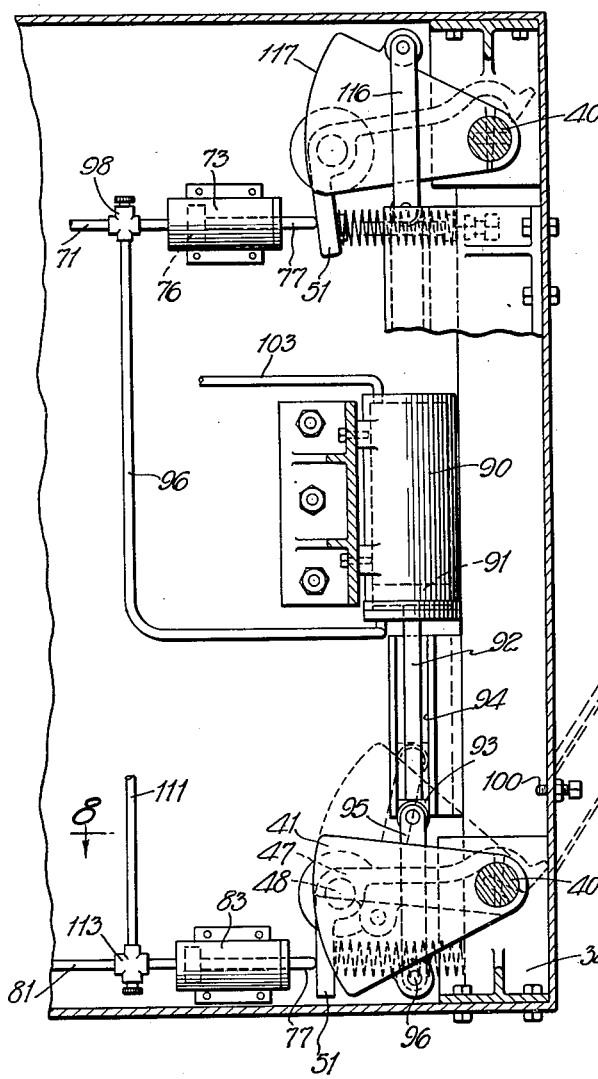

Nov. 5, 1940.    D. BOHNE    2,220,202
TAIL GATE OPERATING MECHANISM
Filed Sept. 15, 1939    4 Sheets-Sheet 1
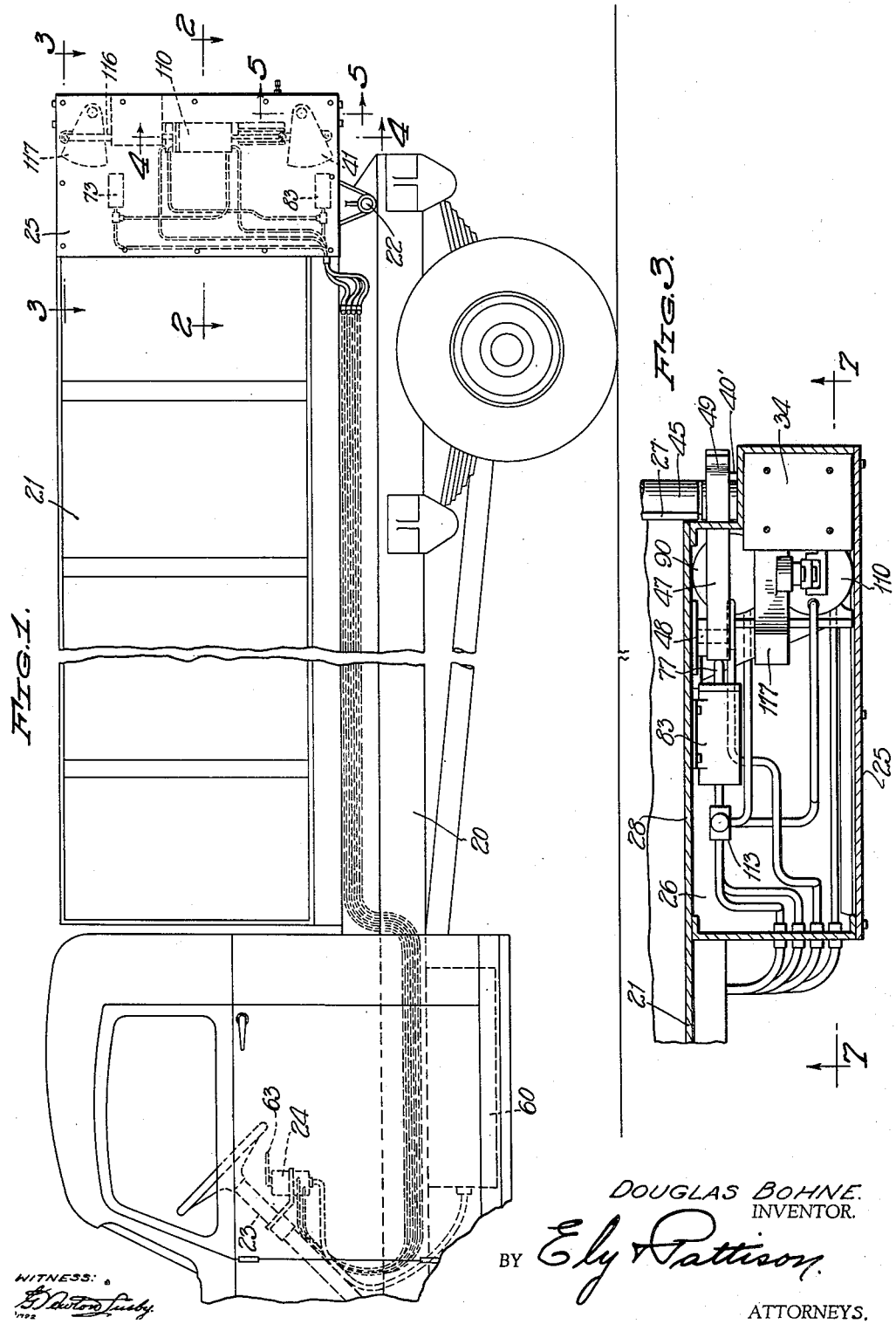
DOUGLAS BOHNE.
INVENTOR.
BY Ely Pattison
ATTORNEYS.

Nov. 5, 1940.  D. BOHNE  2,220,202
TAIL GATE OPERATING MECHANISM
Filed Sept. 15, 1939  4 Sheets-Sheet 2
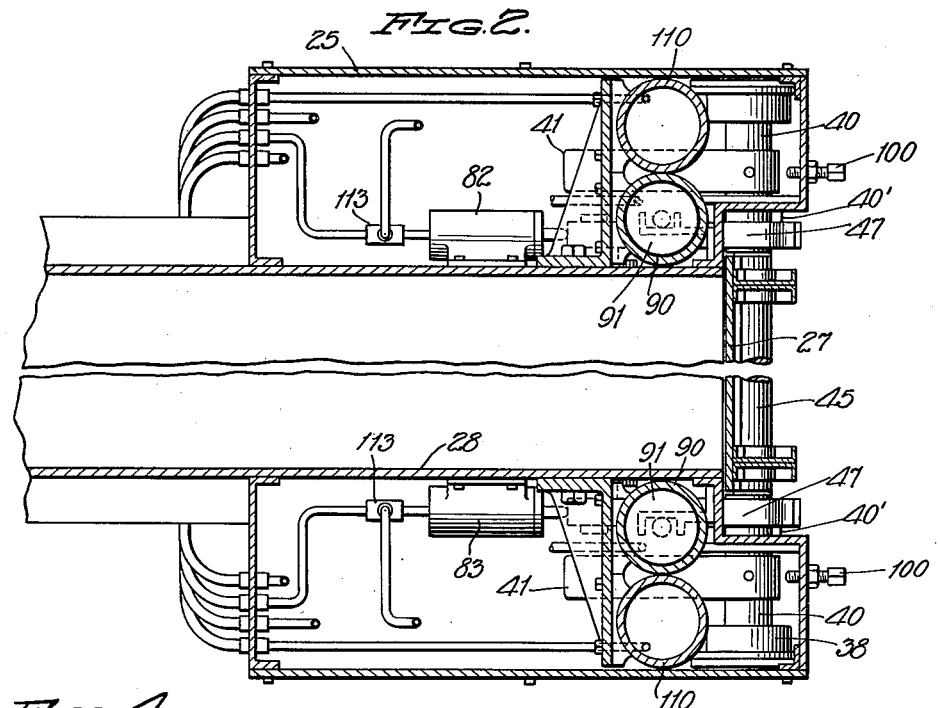
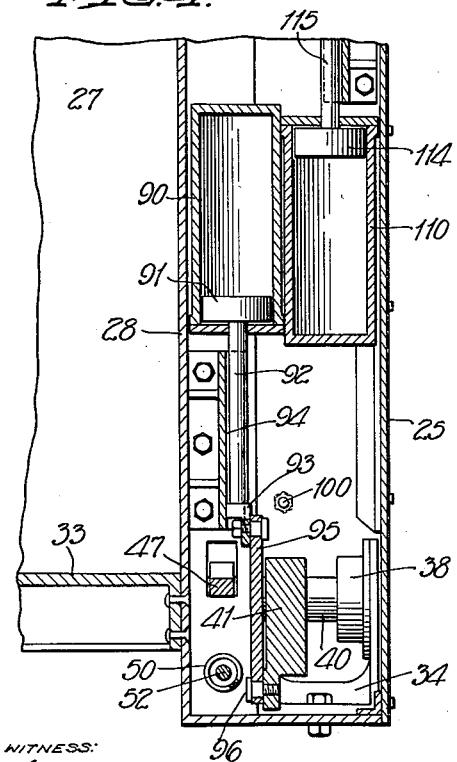
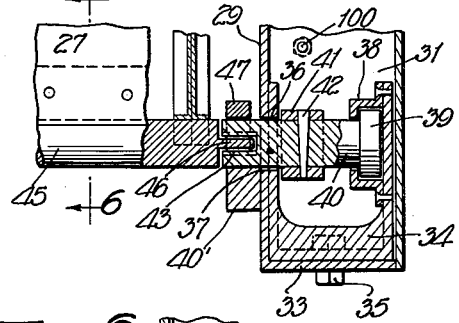
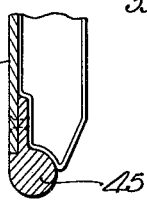
DOUGLAS BOHNE,
INVENTOR.
BY Ely Pattison.
ATTORNEYS.

Nov. 5, 1940.   D. BOHNE   2,220,202
TAIL GATE OPERATING MECHANISM
Filed Sept. 15, 1939   4 Sheets-Sheet 3

DOUGLAS BOHNE
INVENTOR.
BY Ely Pattison
ATTORNEYS.

Nov. 5, 1940.     D. BOHNE     2,220,202
TAIL GATE OPERATING MECHANISM
Filed Sept. 15, 1939     4 Sheets-Sheet 4
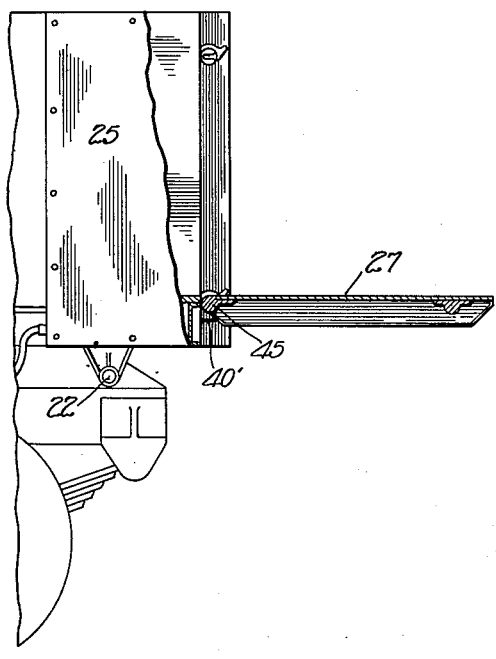
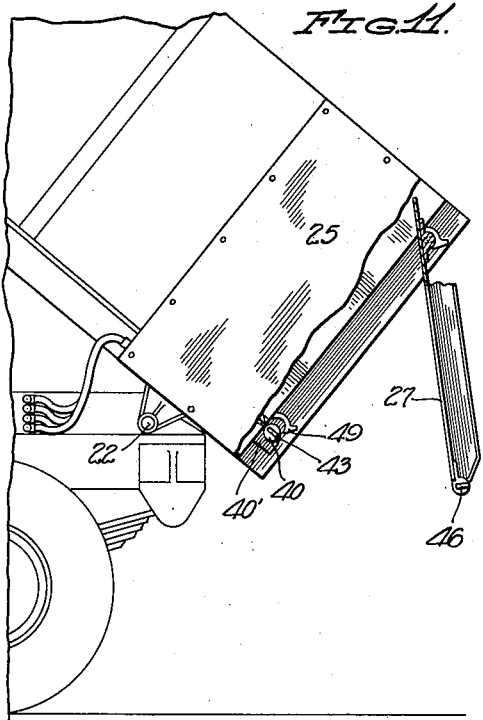
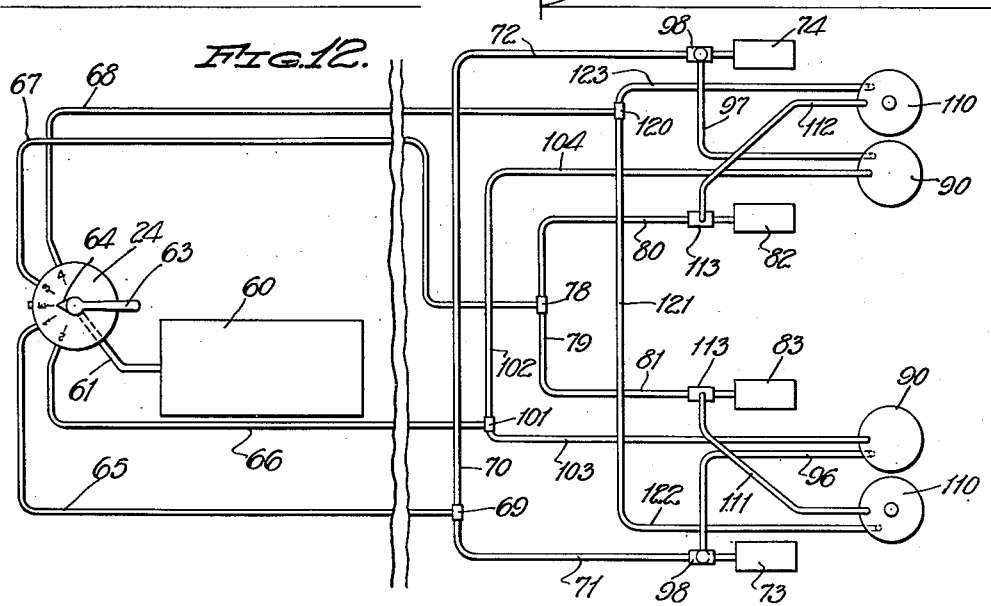
DOUGLAS BOHNE.
INVENTOR.
BY Ely Pattison
ATTORNEYS.

Patented Nov. 5, 1940

2,220,202

UNITED STATES PATENT OFFICE 2,220,202

TAIL GATE OPERATING MECHANISM

Douglas Bohne, New York, N. Y.

Application September 15, 1939, Serial No. 294,999

8 Claims. (Cl. 298—23)

The present invention relates to new and useful improvements in tail gates for vehicle bodies of the dumping type.

One object of the present invention is to improve the construction and mode of operation of the tail gates of dumping vehicle bodies and so to construct the same that they may be operated in various manners dependent upon conditions of loads, and character of dump to be made.

In the present embodiment of the invention the tail gate is illustrated as of the type which is adapted to open, either by pivoting the same at its upper edge and permitting its lower edge to swing free of the body of the vehicle, or by pivoting the tail gate at its lower edge and permitting its upper edge to swing away from the body of the vehicle.

A feature of the invention resides in the provision of power operating means for operating the tail gate, either when it is swung about its upper pivots or its lower pivots to effect the opening of the end of the truck body.

A further feature of the invention resides in the provision of power operated means which may be rendered ineffective under certain operative conditions thereby to permit the tail gate to open under the influence of the pressure of the load to be dumped and to close by the action of gravity.

A further feature of the invention resides in a novel arrangement of parts whereby the tail gate may be power operated in any position of the vehicle body when the body is of the type which is elevated to effect dumping of the contents thereof.

Still a further feature of the invention resides in a novel means for maintaining the tail gate in body closing position together with means for selectively releasing the holding means to permit of swinging movement of the tail gate about either its upper or lower pivots as may be desired.

Still a further feature of the invention resides in the novel construction of the power operating means whereby the same may serve to support the tail gate in a horizontal position when it is swung about its lower pivotal points, thus eliminating the use of supporting chains or other means for retaining the tail gate in the horizontal position.

Still a further feature of the invention resides in the provision of a novel power operating means so constructed and arranged as to operate the tail gate to both its open and closed positions and about its upper or lower pivotal points.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings:

Figure 1 is a view in side elevation partly broken away illustrating a dump truck equipped with a tail gate operating mechanism constructed in accordance with one embodiment of the present invention, a portion of the operating mechanism being shown in dotted lines in said figure.

Figure 9:
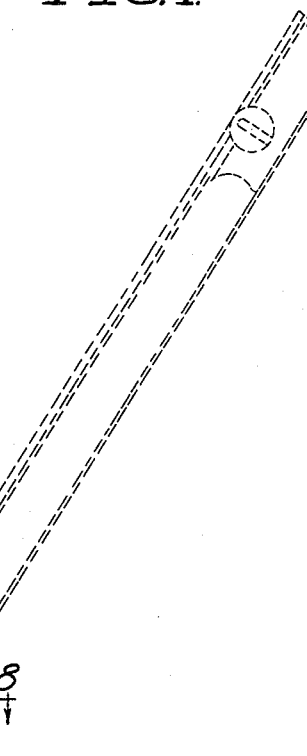
Figure 8:
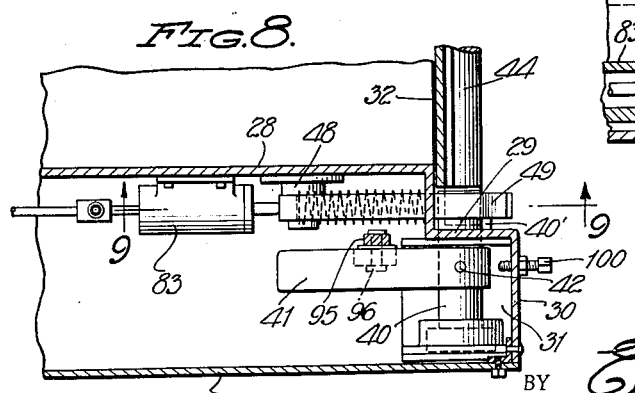

Figure 2 is a horizontal sectional view on an enlarged scale taken substantially on the line 2—2 of Figure 1, Figure 3 is a horizontal sectional view on an enlarged scale taken substantially on the line 3—3 of Figure 1, Figure 4 is a detail vertical sectional view on an enlarged scale taken substantially on the line 4—4 of Figure 1, Figure 5 is a detail vertical sectional view taken substantially on the line 5—5 of Figure 1, Figure 6 is a detail sectional view taken substantially on the line 6—6 of Figure 5, Figure 7 is a vertical sectional view on an enlarged scale taken substantially on the line 7—7 of Figure 3, Figure 8 is a horizontal sectional view taken substantially on the line 8—8 of Figure 7, Figure 9 is a detail vertical sectional view taken substantially on the line 9—9 of Figure 8, Figure 10 is a fragmentary view of the rear end of a dumping truck body illustrating the tail gate as being swung to open position upon its lower pivotal points, Figure 11 is a view similar to Figure 10 illustrating the body of the vehicle as elevated to dumping position with the tail gate swinging about its upper pivotal points, and;

Figure 12 is a diagrammatic view partly broken away illustrating the power actuating mechanism of the tail gate.

The invention is herein illustrated as embodied in a dumping truck. In the drawings the truck chassis is designated 20, the body being designated 21. The body is pivotally mounted on the chassis as at 22 and is adapted to be moved about its pivotal point by a suitable body elevating means of any desired type. The truck illustrated is of the motor type and carried by the steering column 23 thereof, there is a control valve 24 the functions of which will be hereinafter more specifically described.

At its rear end, the truck body is provided at each side with a plate 25 commonly known in the art as a gusset plate. Each of these gusset plates is spaced from its respective side wall of the truck body, which construction forms a housing 26 in which the operating elements of the power operating means of the tail gate may be conveniently enclosed.

The tail gate is designated by the reference character 27 and as illustrated in Figures 10 and 11, is adapted to swing to its open position about either lower or upper pivotal points. To accomplish this result, means is provided whereby the tail gate may be selectively released from either its upper or lower pivotal points as occasion may require and the construction by which this is accomplished will now be specifically described.

First, the lower pivotal mountings of the tail gate will be described and inasmuch as these pivotal mountings are the same on each side of the truck body, the description of one pivotal mounting will suffice. Referring to Figure 8, it will be noted that the side wall of the truck body, which side wall is designated 28, has an off-set or extension 29 which is connected to the gusset plate 25 by means of an end wall 30. This construction provides an extension 31 of the housing 26 between the gusset plate 25 and the side wall 28 of the truck body and this extension of the housing 26 projects beyond the rear edge 32 of the bottom 33 of the truck body as shown in said Figure 8.

The pivot for the tail gate is mounted in this housing extension 31 and is best illustrated in Figure 5. Resting upon the bottom wall of the housing extension 31, there is a supporting bracket 34 which is of U-shaped cross sectional form and which may be secured to the bottom wall 33 of the housing extension 31 by a bolt or the like 35. The inner leg of the supporting bracket 34 is provided with an opening 36 which registers with an opening 37 in the extension 29 of the side wall 28 of the truck body for a purpose to be hereinafter described. The reference numeral 38 designates a collar bearing and mounted in said collar bearing by means of a flanged end 39, there is a stub shaft 40 which stub shaft projects through the alined openings 36 and 37 heretofore mentioned and extends beyond the angular extension 29 of the side wall 28 of the truck body. The inner, or projecting end of the stub shaft overlies a block or the like 40' which is carried by the extension 29 at a point immediately below the projecting end of the stub shaft 40. A counterweight 41 is secured to the stub shaft 40 by means of a cross pin 42 and one edge of this counterweight may have engagement with the inner leg of the supporting brackets through which the stub shaft passes, thus in effect providing a thrust bearing for the stub shaft 40. The projecting end of the stub shaft, which is its inner end, is provided with a slot 43, the purpose of which will be hereinafter described. By this construction, the stub shaft is free to rotate in the collar bearing 38 and the alined openings 36 and 37 respectively in the supporting bracket and the angular extension 29 of the side wall of the truck body.

As heretofore stated, one of these stub shafts is arranged at each side of the truck body and said stub shafts form the lower pivots about which the tail gate swings.

The tail gate 27 is provided upon its lower edge with a bar or the like 45, the ends of which are rounded and extend slightly beyond their respective side edges of the tail gate and are provided with reduced extensions 46 which are adapted to be received in the slots 43 of the inner ends of their respective stub shafts 40 as best illustrated in Figures 5 and 9.

By this construction it will be obvious that the lower end of the tail gate is free to swing outwardly of the end of the body, the reduced extensions 46 of the bar 45 being free to move outwardly of the slots of the stub shafts 40 under certain operating conditions.

Means is provided to retain each of the extensions 46 in the slot 43 of its respective stub shaft 40 as best illustrated in Figure 9. This means comprises a hook 47 pivotally mounted as at 48 upon the side wall of the truck body. The hook 47 has a nose portion 49 which passes over the projected inner end of the stub shaft 40 to a point where it overlies the extension 46 of the bar 45, which construction prevents movement of the extension 46 relatively to the bar 45 so long as the hook is maintained in the position in which it is illustrated in Figure 9. Means is provided to retain the hook normally in that position in which it is shown in Figure 9, and this means consists of a coil spring 50 mounted upon the angular extension 29 of the side wall of the truck body and a depending leg 51 of the hook 47. The spring 50 is supported upon a threaded bolt 52 which threaded bolt performs another function which will be hereinafter specifically set forth.

The position in which the hook is shown in Figure 9 is the normal position thereof and it will be noted that in this position it prevents displacement of the extension 46 relatively to the slot 43 in the end of the stub shaft 40 when the tail gate is in its closed position. It will also be noted that when the several parts are in this position, the tail gate is free to swing as illustrated in dotted lines in Figure 7, the extensions 46 of the bar 45 being retained in the slots 43 in their respective stub shafts 40 by the hooks 47 during a partial movement of the tail gate about its lower pivotal points and by the blocks 40' heretofore mentioned as the slots in the stub shafts 40 pass free of the nose portions 49 of the hooks 47.

While I have described but one of the pivotal mountings, it is to be understood that there are four such pivotal mountings, there being one at each lower corner of the rear end of the truck body and one at each of the upper corners of the rear end of the truck body. There is a slight difference, however, between the pivotal mountings in the lower corners of the truck body and those at the upper corners thereof since it will be obvious that the upper corner pivotal mountings are carried by brackets which are similar to the brackets 34 except that they are inverted and further it will be obvious that the blocks 40' employed in connection with the lower corner pivotal mountings are not necessary.

The tail gate is adapted to be operated by fluid pressure preferably compressed air and the operating fluid is supplied from a storage tank 60 in which the fluid may be stored in any desired manner, the supply of fluid to the storage tank 60 not being herein illustrated.

The storage tank 60 is connected by means of a pipe line 61 to a suitable control or distributing valve 24. The valve 24 may be of any conventional type having five outlet ports, one of which consists of an exhaust for all lines and will be hereinafter referred to as the neutral position. The valve in controlling the supply of fluid under pressure from the pipe line 61 to the various outlet ports thereof is manually operated by means of a valve handle 63 and said handle has an index pointer 64 which indicates the proper position of the valve to open the various ports with respect to the interior of the valve and it is to be understood that when the valve is in the position shown in Figure 12 with its index portion 64 at the position designated E in said figure, the interior of the valve will be open to atmosphere and the pipe line 61 will be closed, and when the valve is moved to open any one of the ports, the pipe line 61 will be opened to the interior of the valve housing. The ports of the valve, other than the exhaust port, are designated 1, 2, 3 and 4. Leading from the port designated 1, there is a pipe line 65; leading from the port designated 2, there is a pipe line 66; leading from the port designated 3, there is a pipe line 67, and; leading from the port designated 4, there is a pipe line 68.

The pipe line 65 connects by means of a coupling 69 with a pipe line 70 having two legs 71 and 72. The leg 71 of the pipe line 70 leads to a horizontally disposed cylinder 73 while the leg 72 of said pipe line leads to a horizontally disposed cylinder 74.

The cylinder 73 is mounted upon the outer face of one side wall of the truck body, adjacent the corresponding upper pivotal point of the tail gate, while the cylinder 74 is mounted upon the opposite side of the truck body in a similar location. Movable in each of the cylinders 73 and 74 there is a piston 76 and extending from each piston 76 and projecting through one end of its respective cylinder, there is a piston rod 77. The cylinders 73 and 74 are so arranged with relation to their respective pivotal points of the tail gate, that the piston rods 77 will, when they are projected from their respective cylinders, engage the depending legs of their respective hooks to move said hooks about their pivotal points and rock them out of engagement with their respective stub shafts to permit of free passage of the extensions of the tail gate from the slots therein. This pivotal movement of the hooks is limited or determined by adjustment of the threaded bolts 52. As the hooks are rocked about their pivotal points their respective springs 50 are placed under tension in order that the hooks 47 and the pistons 76 may be returned to their normal positions under the influence of the tension in the springs 50 when pressure is relieved from the cylinders 73 and 74.

The pipe line 67 is connected by a coupling 78 to a pipe line 79 having two legs 80 and 81. The leg 80 of the pipe line 79 leads to a cylinder 82, the leg 81 of said pipe line leading to a cylinder 83. The cylinders 82 and 83 are located on the outer faces of the side walls of the truck body near the bottom thereof, there being one cylinder at each side of said truck body. The cylinders 82 and 83 are of the same construction as the cylinders 73 and 74 heretofore described and they are arranged one upon each side of the truck body adjacent the lower pivotal points of the tail gate and so positioned with respect thereto that their piston rods 77 engage the depending legs 51 of their respective hooks 47 of the lower pivotal points of the tail gate. These cylinders and their piston rods operate in the same manner as the cylinders 73 and 74 and their piston rods, to operate the hooks of the lower pivotal points of the tail gate which operation has been heretofore described.

There are two power cylinders at each side of the truck body for operating the tail gate. One of these cylinders on each side is adapted to operate the tail gate when it is swung about its lower pivotal point and these cylinders are designated 90 in the drawings. Each of these cylinders 90 has a piston 91 therein and extending from each of the pistons, there is a piston rod 92. Each piston rod 92 is connected to a block 93 slidably mounted in a guideway 94 and pivotally connected to each block there is a link 95 and each link 95 is pivotally connected as at 96 to its respective counterweight 41. The cylinders 90 are of the double action type, that is to say, that pressure may be admitted to either end thereof to move the piston in either direction, as desired. When the tail gate is closed, the pistons 91 in the cylinders 90 are at the lower ends thereof and upon admission of fluid pressure to the lower ends of the cylinders, the pistons will be moved upwardly therein and through the medium of their piston rods and links 95 will exert an upward pull upon their respective counterweights 41 and rock the stub shafts 40 in their bearings, it being remembered that the counterweights 41 are keyed to the stub shafts. By this rocking movement of the counterweights the tail gate, through the engagement of its reduced extensions in the slots of the stub shafts, will be swung about its lower pivotal points.

It is to be understood, however, that before the tail gate can be swung about its lower pivotal points, the upper hooks 47 must be disengaged with the upper extensions of the tail gate and this is accomplished by admission of fluid to the cylinders 73 and 74 to operate the pistons in the manner heretofore described.

Fluid pressure for moving the pistons 91 upwardly of the cylinders 90 is supplied by pipe lines 96 and 97. The pipe line 96 leads directly from the pipe line 71 heretofore mentioned while the pipe line 97 leads directly from the pipe line 72 heretofore mentioned. The pipe lines 96 and 97 are connected with their respective pipe lines 71 and 72 by means of a pressure retarding valve 98. These valves 98 are of the type that, when fluid under pressure is admitted to the pipe line 71, they will retard the flow of fluid to the pipe lines 96 and 97 to such an extent that full pressure therein will not be built up until subsequent to an operation of the pistons in the cylinders 73 and 74. By this construction it will be obvious that when the valve 24 is operated to admit pressure to the pipe lines 65 and 70 by movement of its index pointer 64 to position where it coincides with the port designated 1, the first action is the operation of the upper hooks 47 to move them to the dotted line position shown in Figure 7, and then, as the pressure in the pipe lines 96 and 97 is built up to maximum pressure, the pistons in the cylinders 90 will be elevated and effect movement of the tail gate about its lower pivotal points as illustrated in Figure 7. As the tail gate reaches the horizontal position, the counterweights 41 engage with stops 100 carried by the rear wall of the housing extension 31 which may be adjusted so that as the piston reaches the upper end of its stroke the counterweights will engage the stops, thus supporting the tail gate in said horizontal position.

Having described the manner in which the tail gate is moved about its lower pivotal points to the open position, I will now describe the manner in which the tail gate is moved from its horizontal open position to its closed position.

The pipe line 66 is connected by a coupling 101 to a pipe line 102 which has two legs 103 and 104. The legs 103 and 104 lead to their respective cylinders 90 and admit fluid under pressure to the upper ends thereof on top of the pistons 91 which move therein. Admission of fluid to the upper ends of the cylinders 90 forces the pistons 91 therein downwardly and through the medium of the link connections 95 and with the aid of gravity, the counterweights 41 are returned to their normal positions in which they are shown in full lines in Figure 7, which movement moves the tail gate about its lower pivotal points to the closed position.

To admit fluid under pressure to the tops or upper ends of the cylinders 90, the valve 24 is operated by means of its handle 63 to move its index pointer 64 to coincide with the port designated E to exhaust the pipe lines 65 and 70 after which the valve handle is moved until its index pointer coincides with the port designated 2. With the valve in this position fluid pressure is admitted from the valve to the pipe lines 66 and 102 to the upper ends of the cylinders 90 and operates to force the pistons downwardly therein.

Exhaustion of the pipe lines 65 and 70 releases all pressure from these lines and from the cylinders 73, 74 and 90. Thus, as the tail gate approaches its closed position, the upper extensions thereof ride under the hooks which pivot against the tension of their springs 50 and snap around the extensions of the tail gate as the tail gate reaches closed position in which position the hooks retain the upper extensions 46 in the slots of the upper stub shafts 40 to secure the tail gate in its closed position.

After the tail gate has reached its closed position, the valve handle 63 is moved so that its index pointer coincides with the port designated E to exhaust the pipe lines 66 and 102, leaving the system devoid of fluid pressure beyond the valve 24.

In addition to the power cylinders 90, heretofore described as operating the tail gate about its lower pivotal points, there are two power cylinders 110, they being arranged one at each side of the truck body preferably mounted upon the same brackets as carry the power cylinders 90 heretofore mentioned. These cylinders 110 operate the tail gate when it is moved to open position about its upper pivotal points, by power.

When it is desired to open the tail gate by swinging it about its upper pivotal points with the truck body in a horizontal plane, the valve handle is moved until its index pointer coincides with the port designated 3 in which position fluid under pressure is supplied to the pipe lines 67 and 79. The fluid in the pipe-line 79 passes to the cylinders 82 and 83 which operate the lower hooks 47 in the same manner as described for the upper hooks, rocking said hooks to release the lower extensions 46 with respect to the slots in the lower stub shafts 40.

Fluid under pressure is supplied to the upper ends of the cylinders 110 by pipe lines 111 and 112 each of which extends from a valve 113, there being one of said valves 113 in the leg 80 of the pipe line 79, the other of said valves 113 being located in the leg 81 of the pipe line 79. These valves 113 are of the same general type as the valves 98 heretofore described and as pressure is admitted to the pipe lines 67 and 79, the lower hook operating cylinders 82 and 83 will receive said pressure and operate the lower hooks after which the pressure builds up in the pipe lines 111 and 112 and the cylinders 110, and effects an operation of the pistons therein.

Each of these cylinders has a piston 114 and piston rod 115 which is connected by means of a link 116 with one of the upper counterweights 117 of which there are two arranged one at each side of the truck body and each of which is connected to its respective upper stub shaft 40.

From the foregoing it will be apparent then, that if the handle 63 of the valve be turned until its index pointer coincides with the port designated 3, fluid pressure will be admitted through the pipe lines 67 and 79, legs 80 and 81 to the valves 113, and to the cylinders 82 and 83 which operate the lower hooks and moves them to the releasing position in the same manner as described for the operation of the upper hooks. As the pressure builds up in the legs of the pipe line 79, it passes through the pipe lines 111 and 112 to the upper ends of the cylinders 110 forcing the pistons therein downwardly and through the link connections 116 the upper counterweights are moved downwardly rocking the tail gate about its upper pivotal points to open position. The tail gate may be maintained in this open position merely by maintaining pressure in the pipe lines 67 and 79 and legs 80 and 81 and the pipe lines 111 and 112.

To move the tail gate to closed position under power fluid under pressure is admitted to the lower ends of the cylinders 110 beneath the pistons herein and this is accomplished in the following manner.

The pipe line 68 is connected by means of a coupling 120 to a pipe line 121 which has two legs 122 and 123. The leg 122 of the pipe line 121 is connected to the lower end of one of the cylinders 110, the leg 123 of the pipe line 121 being connected to the lower end of the other cylinder 110. Thus, when the valve handle 63 is operated to move its index pointer to the position designated E to exhaust the pipe lines 67, 79, 111 and 112, and subsequently moved to the port designated 4, fluid under pressure will be admitted to the pipe lines 68 and 121 and the legs 122 and 123 thereof and to the lower ends of the cylinders 110 to force the pistons upwardly of their cylinders.

The tail gate may also be moved to the open position about its upper pivotal points by the weight or pressure of the load in the truck body if the truck body be elevated to dumping position as illustrated in Figure 11 and this phase of the operation will now be described.

With the parts in the neutral position heretofore mentioned, if the handle 63 of the valve be grasped and the valve turned until the index pointer coincides with the port designated 3, pressure will be admitted to the pipe lines 67, 79, legs 80 and 81 of the pipe line 79 through the valves 113 to the cylinders 82 and 83, releasing the lower hooks 47. If now, the valve handle 63 be moved until its index pointer 64 coincides with the port designated E the pipe lines 67, and 79, the legs 80 and 81 and the cylinders 82 and 83 will be exhausted before the pressure can build up sufficiently in the pipe lines 111 and 112 to operate the pistons in the cylinders 110. Thus, it will be seen that the lower hooks may be operated to release the lower end of the tail gate and permit its swinging about its upper pivotal points under the influence of the load to be dumped and without any operation upon the part of the cylinders 110.

From the foregoing it will be apparent that the present invention provides a novel mechanism for operating the tail gates of vehicles by means of power in such a manner that the tail gate may be operated to swing about either upper or lower pivotal points as the case may be. Furthermore, after a selection as to the pivotal points about which it is desired to swing the tail gate, the operation of releasing the holding means and subsequent operation of the tail gate are performed automatically in their proper sequence The invention has been herein illustrated in its preferred form but it is to be understood that it is not to be limited to the specific constructions and form shown and that it may be embodied in such other forms as rightfully fall within the scope of the appended claims.

Having thus described the invention, what is claimed is:

1. Tail gate operating means for dumping vehicle bodies comprising in combination, a vehicle body, a tail gate therefor, means for pivotally mounting said tail gate at its upper edge to permit of free swinging movement of the lower edge of the tail gate, means for pivotally mounting said tail gate at its lower edge to permit of free swinging movement of its upper edge, means for holding said tail gate against swinging movement about its upper edge, means for holding said tail gate against swinging movement about its lower edge, fluid operated means for selectively operating said tail gate holding means to selectively release them and permit of swinging movement of the tail gate about either its upper or lower edge and for operating the tail gate after either of the holding means has been released, and control means for said fluid operating means for preventing operation of the tail gate until after the selected holding hooks have been released.

2. Tail gate operating means for tail gates of vehicle bodies comprising in combination, a vehicle body, a tail gate therefor, means for pivotally connecting the tail gate to the body at or near its lower edge, means for pivotally connecting the tail gate to the body at or near its upper edge, means for normally retaining the tail gate in operative engagement with both upper and lower pivotal means to retain the tail gate in its closed position, means for selectively releasing the upper or lower tail gate retaining means, and for operating the tail gate after release of either the upper or lower tail gate retaining means has been released, and means for preventing operation of the tail gate until after the selected tail gate retaining means has been released.

3. Tail gate operating means for the tail gates of vehicle bodies comprising in combination, a vehicle body, a tail gate for closing one end of the vehicle body, and means for mounting and operating the tail gate for swinging movement selectively about either its upper or lower edge to open the end of the vehicle body, said means including a rotatable stub shaft at each side of the body at the bottom thereof, means for simultaneously rotating said lower stub shafts, a rotatable stub shaft at each side of the body at the top thereof, means for simultaneously rotating said upper stub shafts, means carried by the tail gate for releasable driving engagement with each of said stub shafts, means for retaining the tail gate in driving engagement with said lower stub shafts, means for simultaneously releasing said lower retaining means, means for retaining said tail gate in driving engagement with said upper stub shafts, means for simultaneously releasing said upper retaining means, and control means whereby the retaining means may be selectively operated to release either the upper or lower edge of the tail gate for swinging movement and subsequently to set into operation the stub shafts with which the tail gate is retained in driving engagement.

4. Tail gate operating means for the tail gates of vehicle bodies comprising in combination, a vehicle body, a tail gate for closing one end of the vehicle body, and means for mounting and operating the tail gate for swinging movement selectively about either its upper or lower edge to open the end of the vehicle body, said means including a rotatable stub shaft at each side of the body at the bottom thereof, means for simultaneously rotating said lower stub shafts, a rotatable stub shaft at each side of the body at the top thereof, means for simultaneously rotating said upper stub shafts, means carried by the tail gate for releasable driving engagement with each of said stub shafts, means for retaining the tail gate in driving engagement with said lower stub shafts, means for simultaneously releasing said lower retaining means, means for retaining said tail gate in driving engagement with said upper stub shafts, means for simultaneously releasing said upper retaining means, and control means whereby the retaining means may be selectively operated to release the tail gate from driving connection with either the upper or lower stub shafts to release either the upper or lower edge of the tail gate for swinging movement and subsequently to set into operation the stub shafts with which the tail gate is retained in driving engagement.

5. Tail gate operating means for the tail gates of vehicle bodies comprising in combination, a vehicle body, a swinging tail gate for closing one end of the vehicle body, a plurality of stub shafts for pivotally mounting said tail gate for swinging movement, a plurality of hooks for holding said tail gate in its closed position, means for operating said stub shafts to effect an opening or closing of said tail gate, means for moving the hooks to tail gate releasing position, and control means whereby the tail gate operating means is rendered operative subsequently to the operation of the tail gate holding hooks.

6. Tail gate operating means for the tail gates of vehicle bodies comprising in combination, a vehicle body, a swinging tail gate for closing one end of the vehicle body, a plurality of stub shafts for pivotally mounting said tail gate for swinging movement, a plurality of hooks for holding said tail gate in its closed position, means for operating said stub shafts to effect an opening or closing of said tail gate, means for moving the hooks to tail gate releasing position, and control means whereby the tail gate operating means is rendered operative to move the tail gate to its open position subsequently to the operation of the tail gate holding hooks and for operation of the stub shafts to move the tail gate to its closed position.

7. Tail gate operating means for the tail gates of vehicle bodies comprising in combination, a vehicle body, a swinging tail gate for closing one end of the vehicle body, a plurality of stub shafts for pivotally mounting the tail gate for swinging movement, a plurality of hooks for holding said tail gate in its closed position, fluid pressure operated means for moving said hooks to tail gate releasing position, fluid pressure operated means for operating the stub shafts to effect an opening of the tail gate, means for simultaneously admitting fluid under pressure to the fluid pressure hook operating means and to the fluid pressure stub shaft operating means, and control means for rendering inoperative the stub shaft operating means until such time as an operation of the hook operating means has effected movement of the hooks to tail gate releasing position.

8. Tail gate operating means for the tail gates of vehicle bodies comprising in combination, a vehicle body, a swinging tail gate for closing one end of the vehicle body, a plurality of stub shafts for pivotally mounting the tail gate for swinging movement, a plurality of hooks for holding said tail gate in its closed position, fluid pressure operated means for moving said hooks to tail gate releasing position, fluid pressure operated means for operating the stub shafts to effect an opening of the tail gate, means for simultaneously admitting fluid under pressure to the fluid pressure hook operating means and to the fluid pressure stub shaft operating means, control means for rendering inoperative the stub shaft operating means until such time as an operation of the hook operating means has effected movement of the hooks to tail gate releasing position, and separate means for admitting fluid under pressure to the fluid pressure stub shaft operating means to effect a closing of the tail gate.

DOUGLAS BOHNE.